United States Patent [19]

von Bonin

[11] Patent Number: 5,382,387

[45] Date of Patent: * Jan. 17, 1995

[54] MOULDINGS CONTAINING EXPANDABLE GRAPHITE, THEIR PRODUCTION AND THEIR USE

[75] Inventor: Wulf von Bonin, Odenthal, Germany

[73] Assignee: Bayer Aktiengesellschaft, Leverkusen, Germany

[*] Notice: The portion of the term of this patent subsequent to Oct. 1, 2008 has been disclaimed.

[21] Appl. No.: 939,200

[22] Filed: Sep. 2, 1992

Related U.S. Application Data

[63] Continuation-in-part of Ser. No. 730,360, Jul. 15, 1991, Pat. No. 5,182,049.

[30] Foreign Application Priority Data

Sep. 12, 1991 [DE] Germany .............................. 4130335

[51] Int. Cl.⁶ .................... C09K 21/04; C04B 35/00; C09D 5/16
[52] U.S. Cl. .................... 252/602; 252/601; 252/606; 252/378 R; 252/62; 252/62.3 R; 252/62.3 T; 252/478; 106/18.11; 106/18.14

[58] Field of Search ............ 252/601, 602, 606, 609, 252/8.05, 3, 378 R, 62, 62.3 R, 62.3 T, 478; 428/469, 470, 472.3; 106/18.11, 18.14, 18.18

[56] References Cited

U.S. PATENT DOCUMENTS 4,146,401 3/1979 Yamada et al. ..................... 106/56
4,234,638 11/1980 Yamazoe et al. .................... 423/133
5,053,148 10/1991 von Bonin ......................... 252/8.05

FOREIGN PATENT DOCUMENTS 0458150 5/1991 European Pat. Off. .
1504841 8/1975 United Kingdom .

*Primary Examiner*—Robert L. Stoll
*Assistant Examiner*—Joseph D. Anthony
*Attorney, Agent, or Firm*—Sprung Horn Kramer & Woods

[57] ABSTRACT

Mouldings containing expanded expandable graphite are characterised in that they additionally contain acid phosphates of metals of group 2 and/or 3 of the periodic table of the elements and/or pyrolysis products thereof. Such mouldings are distinguished by the fact that they have low odour and are mechanically stable, and, when in contact with water, do not have pH values which are too low.

7 Claims, No Drawings

MOULDINGS CONTAINING EXPANDABLE GRAPHITE, THEIR PRODUCTION AND THEIR USE

This is a continuation-in-part of application Ser. No. 730,360, filed Jul. 15, 1991, now U.S. Pat. No. 5,182,049.

BACKGROUND OF THE INVENTION

Expandable graphites expand by about 50 to more than 600 % by volume on heating to temperatures above about 150° C. This expandability is based on the fact that foreign constituents are embedded between the lattice planes of the graphite and these cause widening of the lattice plane interstices when energy is supplied. These foreign constituents can be, for example, metallic groups, halogens, OH groups, acid radicals, $SO_x$ and/or $NO_x$. Those expandable graphites which can be obtained by treatment of the graphite with sulphuric acids and nitric acids and/or other oxidising agents, for example hydrogen peroxide, are known in particular. $SO_x$- or $NO_x$-expandable graphites are also referred to, depending on whether it is a species which liberates more $SO_x$ or more $NO_x$ during thermal expansion.

If such expandable graphites are heated in powder form to temperatures above 200° C. in partly filled, closed moulds, they expand and fill the mould to form mouldings of relatively low stability. In addition to their relatively low mechanical stability, mouldings produced in this manner also have the disadvantage that, because of the sensitivity of the graphite to oxidation, they can be used in the long term only at temperatures below about 450° C.

These undesirable properties of the expandable graphite, lightweight mouldings can be improved considerably by additions of ammonium salts of acid metal phosphates, in particular ethanolamine salts of acid aluminium phosphates.

However, it has been found that mouldings produced in this way from expandable graphite containing sulphur release unpleasant odours at fresh cut and fracture points, which is undesirable in particular for use in closed rooms.

SUMMARY OF THE INVENTION

Mouldings containing expanded expandable graphite have now been found, which are characterised in that they additionally contain acid phosphates of metals of group 2 and/or 3 of the Periodic Table of the Elements and/or pyrolysis products, and advantageously additional binders.

Surprisingly, the combination of graphites which are capable of expansion/acid metal phosphates allow the undesirable odours to occur to only a greatly reduced extent, if at all. To achieve good binder properties, it is advantageous to employ additional binders. Such additional binders can be inorganic or, preferably, organic in nature. Such additional binders can be of low molecular weight, oligomeric or of high molecular weight. They should expediently have the lowest possible volatility at temperatures below 180° C. and should not tend to distil off at temperatures above 180° C. in the presence of the acid metal phosphates and the expandable graphite, but react to form pyrolysis products which largely remain in the moulding formed. They therefore preferably have boiling points above 180° C. and decomposition points of between 180° and 600° C.

DETAILED DESCRIPTION OF THE INVENTION AND PREFERRED EMBODIMENTS

Possible graphites which are capable of expansion are all graphites which expand on heating to temperatures above 180° C., preferably to temperatures of 200° to 600° C., and $SO_x$- and $NO_x$-expandable graphites are of particular interest. The graphites can also be pre-expanded graphites which are still capable of expansion, or neutralised or coated expandable graphites. Various types of expandable graphite and/or various graphites which are capable of expansion and/or various pre-expanded graphites which are still capable of expansion can also be present as mixtures.

These can also be mixtures of expandable graphites with additives which are capable of expansion and/or incapable of expansion, which mixtures can contain the expandable graphites in amounts of, for example, 100-5% by weight, preferably 85-20% by weight.

Examples of additives which are not capable of expansion are porous materials, such as powders, granules and fibrous forms of wood, straw, cereal grains, fruit stones, fruit peels, coke, expanded graphite, vermiculite, perlite, cork, foamed glass, expanded clay, fly ash, hollow glass beads, mineral fibre granules, foamed concrete and porous particles of organic vinyl polymers, polyurethanes and other polymers.

Examples of non-porous additives which are incapable of expansion are graphite, carbon black, starch, borax, hard coal, brown coal, glasses, asbestos, kaolin, chalk, rock powder, aluminium oxide and its hydration products, metals, polymer powders, polymer granules, cellulose, lignin and bitumens.

Examples of additives which are capable of expansion are cereal grains, corks, mica, vermiculites, perlites, water-containing alkali metal silicates, borosilicates and alumosilicates which are capable of expansion and have an expansion capacity in the range from 180° to 1000° C., preferably 200° to 600° C.

The types of additives mentioned which are capable of expansion and those which are incapable of expansion sometimes overlap, since, for example, cereal grains, cork, vermiculites and the like occur both in expandable and in non-expandable forms.

The additives can be employed individually or as mixtures.

Possible acid phosphates are all the metal salts of acids of phosphorus which still contain acid groups. Acid salts of ortho-phosphoric acid are preferably employed. Among the metals of groups 2 and 3 of the Periodic Table of the Elements, magnesium, calcium and zinc and in particular aluminium are preferred.

Acid phosphates of aluminium which are accessible by reaction of 1 mol of aluminium hydroxide with 1.5 or more, in particular 2.5 to 3.5 mol of ortho-phosphoric acid are preferably used. Other aluminium compounds or aluminium metal can of course also be used as the starting substance for the synthesis of such salts. The abovementioned reaction can take place in an aqueous medium at, for example, 15° to 150° C., preferably 80° to 120° C.

The acid phosphates are preferably employed as such according to the invention. Although the use of alkalis can be considered, it is in general often not advantageous in respect of the generation of odour described above and in respect of the resistance of the mouldings to water.

The component mixtures finally employed for expansion to give mouldings can contain the acid phosphates, for example, in amounts of 4 to 75% by weight, preferably 15 to 45% by weight.

Phosphate mixtures can also be used.

A process has also been found for the production of mouldings containing expandable graphite, which is characterised in that expandable graphite and acid phosphates of metals of group 2 and/or 3 of the Periodic Table of the Elements are heated to temperatures above 180° C. in moulds which are permeable to gas but largely closed.

The acid phosphates and the expandable graphite or the mixtures containing expandable graphite can be combined, for example, by mixing a flowable, for example 20 to 90, preferably 50 to 80% strength by weight aqueous phosphate solution with the solids. If appropriate, the mixture can then be dried. A combination of the phosphate solid, if appropriate in powdered form, with the other solids can also be considered. Another variant is the preparation of the acid phosphates in the presence of expandable graphite or expandable graphite mixtures.

The additional binders to be employed, if appropriate, can be mixed with the expandable graphites, for example, in the form of aqueous emulsions, dispersions, as solutions in organic solvents or as such in the liquid form or as solids, if appropriate in powder form, together with the acid phosphates or before or after these.

Examples of additional binders are silicate solutions (for example water glass), silicic acid esters, silicic acid polyesters, titanium esters, titanium polyesters, phosphates and/or polyphosphates of ammonia, amines (for example alkanolamines) or metals, hexamethaphosphates, esters and polyesters of phosphoric acids, borates, water-soluble and/or low-melting (below 600° C.) silicates and glasses. Substances which form pyrolytic carbon, such as polyalcohols, sugars, starch, cellulose and other carbohydrates, molasses, lignin, casein, chitin and similar naturally occurring substances, tars, coal slurries, bitumens, biological sewage sludges, residual substances (for example from distillations of isocyanate chemistry) from the production of mineral oil, coal, plastic, synthetic resin, varnish, colophony and/or tall oil and synthetic resins, synthetic resin precursors and polymers, are preferred. The additional binders can be employed in powder form or in the form of dispersions, sludges, tars and slurries, if appropriate from the disposal and recycling industry.

Polyester- and polyether-polyols and dispersions and lattices of rubbers and/or olefin polymers, as well as aqueous solutions of formaldehyde resins and carbohydrates, and also tars and bitumens, have proved to be particularly easy to meter, to have good binding properties and to be reproducibly accessible.

The component mixtures employed for expansion to mouldings can contain the additional binders, for example, in amounts of 0 to 85% by weight, preferably 5 to 70% by weight, in particular 10 to 40% by weight.

The component mixtures finally employed for expansion of mouldings can be prepared by conventional methods. For example, the graphites which are capable of expansion can be mixed in a mixing unit, for example a paddle mixer, with the additives which are also to be used if appropriate, and a, for example, 20 to 90, preferably 40 to 75% strength by weight aqueous solution of the acid phosphate followed by, if appropriate, the auxiliary binder present in the form of an aqueous dispersion can then be added in the same unit. The component mixture thus obtained can be dried and granulated, or ground and sieved, or introduced into the expansion process directly in the moist, free-flowing state.

The expansion process can be carried out in one or more stages to give the moulding having the envisaged density.

For this operation, a defined amount of the mixture envisaged for expansion is introduced into a mould which is closed but permeable to the gases, air and steam which escape during expansion.

The mould is preferably made of ceramic or metals. It can be protected with customary release agent formulations, for example those based on graphite, talc or carbohydrates. The mould walls can also be lined, to prevent caking, with paper, woven fabrics, varnish coatings or metal foils. The oxide layer on the mould surfaces is often sufficient as a release agent. Moulds of other materials, for example of glass, glass ceramic, quartz and plastics, are also possible.

The moulds can be filled completely or partly with the mixture which is capable of expansion, depending on the density and expansion capacity of the mixture. For improved homogeneity of the moulding obtainable, the expandable graphite or the component mixture which is capable of expansion and has the composition according to the invention is preferably subjected to pre-expansion at between 180° and 350° C., in particular 200° and 300° C., and the material pre-expanded in this way to a bulk density of between 40 and 250 kg/m$^3$ is used, if appropriate after addition of additives, acid phosphates and/or additional binders, to fill the mould. The heating process which subsequently takes place leads to a residual expansion which compacts the pre-expanded product contained in the mould to a mechanically stable moulding, if appropriate without additional overall expansion.

It is also possible, and under certain circumstances more economical, to produce a moulding by expansion of a material which has not been pre-expanded.

The heating is preferably carried out in an oven into which the mould is introduced. The mould can also be heated directly, for example by induction or by high-frequency waves, microwaves or IR radiation. If appropriate, the heat can be generated here in the substrate itself.

The expansion temperatures are above 180° C., and can be up to 1000° C. and more. They are preferably between 200° and 700° C. However, it is also possible to carry out the expansion at between only 180° and 400° C., in particular between 200° and 300° C., in which case mouldings which can expand further on further heating, for example with a flame, are obtained. Because of this intumescent property, such mouldings are of particular interest in the fire protection sector.

The mouldings accessible in this way have, inter alia, densities of less than 1000 kg/m$^3$, usually between 30 and 450 kg/m$^3$, preferably between 40 and 200 kg/m$^3$. They are mechanically ductile and are built up from map-like structures. They are usually electrically conductive, that is to say can also be used as heating elements, microwave collectors, earthing elements and an antistatic material. They are suitable for absorbing shock, sound and chemicals. They can be used for shielding from electromagnetic waves and fields, and as materials in nuclear technology or chemistry. On the basis of their intumescence capacity which may be present and their stability when exposed to flame and great heat, the mouldings can be used in fire protection technology. Their moderate thermal conductivity enables them to be used for regulated removal and supply of heat (for example in pot bases, heating units, heat exchangers, exhaust systems and catalyst supports) and as carriers for electronic components. The mouldings can be galvanised, coated by vapour deposition, coated, varnished, and laminated with films, woven fabrics or other materials. If the mould walls in which the mouldings according to the invention were produced were lined with non-wovens, woven fabrics, paper or metal foils, for example those of aluminium, the mouldings are then laminated, also 3-dimensionally, with the corresponding material.

Mouldings which have density gradients across their cross-section and which can also be provided, if appropriate, with various top layers of, for example, aluminium or viscose staple pyrolysate or glass, can also be produced by appropriate variation of the production process, for example use of pre-expanded products of different bulk density for filling the moulds in layers.

The use of mouldings according to the invention for insulation against sound and rapid passage of heat, for protection from the effects of fire, impact and shock, for the purpose of electrical current conduction, for absorption of and/or shielding against electrical and electromagnetic effects and/or against chemical attack, for the purpose of construction of containers and housings and as a sandwich intermediate layer or as a composite constituent or material is of particular interest.

The invention is illustrated by way of example below. The parts and percentages stated relate to the weight, unless noted otherwise.

EXAMPLES

General

A 50% strength aqueous solution of a phosphate obtainable by dissolving 1 mol of aluminium hydroxide in 3 mol of ortho-phosphoric acid in an aqueous medium at 90° to 120° C. was used as the acid phosphate solution (AlP).

A 50% strength plastic latex of a styrene/butadiene copolymer (Baystal ® P 1300; Bayer AG) was used as an additional binder (HB).

A commercially available powdered hard bitumen was used as another additional binder (HBA).

A fat coal powder having an average particle diameter of 2 mm, which was pyrolysed to form a porous coke, was used as an additive (A).

The specific indentation resistance was used as a measure of the mechanical strength of the resulting mouldings. This was calculated from the quotient of the average indentation resistance (stamp having a circular area of 5 mm diameter) measured on 5 samples of material without covering films in $kg/cm^2$ and the density of the sample in $g/cm^3$. It is designated IR.

A commercially available $SO_x$-expandable graphite which had a volume expansion of 1:100 at 400° C. was used as the expandable graphite (EG).

Sample sheets were produced using a sheet mould of steel which was lined with domestic aluminium foil and had internal dimensions of 11.6×11.6×2 cm, which corresponded to the dimensions of the sample sheets produced with this mould. Abbreviation: mould and sheet.

I. Examples (I.1 to I.4 and I.7 and I.8 are comparison examples)

I.1: Examples 29 g of EG were introduced into the mould and were heated at 600° C. for 3 hours and cooled. A sheet having an IR of 43 was obtained.

I.2

The EG was pre-expanded at 250° C., the bulk density then being 100 g/l. The mould was filled with the pre-expanded product (28 g), which was then heated at 600° C. for 3 hours. After cooling, the sheet could not be removed from the mould since the material has no cohesion.

No unpleasant odour was found with Examples I.1 and I.2 when the mould was opened and when the sheet was fractured.

I.3

500 parts of EG were mixed with 300 parts of AlP and then with 120 parts of monoethanolamine on a paddle mixer. The mixture was then dried and ground to an average particle diameter of 2.5 mm. The mould was filled with 30 g of the granules and brought to 600° C. analogously to I.1 and I.2. After cooling, a stable sheet having a density of about 100 $kg/m^3$ and an IR of 118 was obtained.

I.4

The granules from I.3 were pre-expanded at 215° C. to a bulk density of about 100 g/l. 29 g were introduced into the mould and heated at 600° C. The sheet produced from this pre-expanded product was stable and had an IR of 119.

In contrast to I.1 and I.2, an $H_2S$-like odour was detected at fracture points on the sheets from I.3 and I.4.

I.5

500 parts of EG were mixed with 300 parts of AlP and the mixture was dried and granulated. The granules (29 g) were processed to a sheet in the mould at 600° C. This sheet has an IR of 110.

I.6

A pre-expanded product having a density of 100 g/l was produced from the granules from I.5 at 230° C. 29 g of this product were introduced into the mould and processed to a sheet at 600° C. This sheet had an IR of 102.

At an acceptable mechanical strength, the sheets from I.5 and I.6 no longer gave an unpleasant odour at fracture points. They had a pH of about 4 in water.

I.7

Instead of AlP, only 50% strength ortho-phosphoric acid was used in the preparation of the granules analogously to I.5. The granules gave sheets having an IR of less than 50 which, although they also no longer had an $H_2S$-like odour, led to an unacceptably low pH of less than 2 when they were brought into contact with water.

I.8

Instead of AlP, a 50% strength solution of a salt of 100 parts of ortho-phosphoric acid and 110 parts of ethanolamine was employed in the preparation of the granules analogously to 1.5. Although sheets having an IR of 110 were obtained from the granules, these had a strong $H_2S$-like odour at fresh cut and fracture points and likewise had too strong an acid character in contact with water (pH of about 2).

I.9

The procedure was as for I.5, but in addition to AlP, 100 parts of HB were incorporated. The granules gave sheets having an IR of 112, the pH in water was 4 and no H$_2$S-like odour was detected.

These example show that a) the unpleasant H$_2$S-like odour occurred when alkanolamine was present and b) the use of amine-free binder formulations led to end products which no longer had the unpleasant H$_2$S-like odour and had good strength and acceptable pH values in combination with water.

II. Examples with variations of the binders

II.1.1

500 parts of EG were mixed with 300 parts of AlP and 20 parts of HB in a paddle mixer. The mixture was then dried and ground (granulated) to an average particle diameter of 2.5 mm.

30 g of the granules were introduced into the mould. This was closed and heated in an oven at 600° C. for 1 hour. After cooling, the sheet was removed from the mould and freed from the aluminium top layers with which the sheet had been laminated. An IR of 108, no odour and, in contact with water, a pH of 4 were then found.

II.1.2

A pre-expanded product having a bulk density of 100 g/l was prepared from the granules from II.1.1 at 230° C. 29 g of this product were introduced into the mould and, after being closed, the mould was heated at 600° C. for 1 hour. After cooling, a sheet having properties as in II.1.1 was removed.

II.2.1

The procedure was as in II.1.1, but using 150 parts of HB. A sheet having an IR of 112 was obtained.

II.2.2

The procedure was as in II.1.2, but using 150 parts of HB. A sheet having an IR of 111 was obtained.

The density of these sheets produced, like the others, with about 30 g of material was about 100 kg/m$^3$.

II.3

500 parts of EG were mixed with 300 parts of AlP and with 100 parts of polyethylene oxide (molecular weight 1500) at 80° C. The mixture was then cooled and granulated. 30 g of granules were introduced into the mould and expanded at 600° C. for 1 hour. A sheet having an IR of 102 was obtained. If pre-expanded product (30 g) prepared at 220° C. and having a bulk density of 100 g/l was used, a sheet having an IR of 101 was obtained on cooling. In both cases, no odour occurred and a pH of 4.5 prevailed after contact with water.

II.4

The procedure was as for II.3, but instead of the polyethylene oxide, an adipic acid diethylene glycol polyester (molecular weight 2000) was used. A sheet having an IR of 107, no odour and a pH of 4 was in each case obtained from granules and pre-expanded product.

II.5

The procedure was as in II.3. Instead of AlP, a 50% strength aqueous solution of a phosphate, prepared at 90° to 120° C., of 1 mol of aluminium hydroxide and 2 mol of ortho-phosphoric acid was used. A sheet having an IR of 101, no odour and a pH of 5 was in each case obtained from the granules and pre-expanded product.

II.6

500 parts of EG were mixed with 400 parts of phosphate solution according to II.5, and 100 parts of HB were then mixed in. The mixture was dried and granulated and the granules were expanded at 600° C. A sheet having an IR of 107, no odour and a pH of 5 was obtained.

II.7

The procedure was as in II.1.1., but instead of HB, 100 parts of 50% strength invert sugar solution were used. A sheet having an IR of 112, no odour and a pH of 4 was obtained.

II.8

The procedure was as in II.1.1. Instead of HB, however, 100 parts of 45% strength pressed-out sewage sludge from a municipal biological clarification plant were incorporated. A sheet having an IR of 110, no odour and a pH of 4.5 was obtained.

II.9

The procedure was analogous to II.1.1. However, 150 parts of HB and in addition 50 parts of expanded perlite granules (density 215 kg/m$^3$, particle diameter on average 3.5 mm) were incorporated. A sheet having an IR of 120, no odour and a pH of 4.5 was obtained.

II.10

The procedure was as in II.9, but instead of perlite granules, expanded cork (density 90 kg/m$^3$, average particle diameter 3 mm) was used. A sheet having an IR of 109, no odour and a pH of 4 was obtained.

II.11

The procedure was as in II.2.1. However, 200 parts of hard bitumen powder sieved off to a particle diameter of less than 3 mm were also additionally incorporated in. The resulting sheet had an IR of 120, no odour and a pH of 4. Sheets of a corresponding pre-expanded product which was prepared at 230° C. had an IR of 119, no odour and a pH of 4.

II.12

The procedure was as in II.1.1. Instead of 500 parts of EG, however, a mixture of 300 parts of EG and 200 parts of A was employed. The resulting sheet had an IR of 115, no odour and a pH of 4.5.

II.13

The procedure was as in II.1.1. Instead of 500 parts of EG, however, only 300 parts were employed. After the HB had been admixed, 200 parts of A were also admixed. A sheet having an IR of 117, no odour and a pH of 4.5 was obtained.

II.14

The procedure was as in II.1.2, but a mixture of 20 g of pre-expanded product and 9 parts of A was introduced into the mould. A sheet having an IR of 110, no odour and a pH of 6 was obtained.

III. Examples with process variations

III.1

500 parts of EG were mixed with 200 parts of 75% strength AlP solution. 100 parts of HB were then added. Moist granules, thoroughly homogenised in a paddle mixer, were obtained, and 35.3 g of these were introduced into the mould in the moist state and were expanded to a moulding in this state in an oven preheated to 600° C. (1 hour). The resulting sheet had a density of about 100 kg/m$^3$, an IR of 113, no odour and a pH of 4.

III.2

EG was expanded at 250° C. to a pre-expanded product having a bulk density of 110 g/l. This pre-expanded product (500 parts) was sprayed with 300 parts of AlP in a high-speed paddlemixer. A material which can be scattered was obtained. 38.4 g of this material were introduced into the mould and expanded at 600° C. for 1 hour. A sheet having an IR of 115 and a pH of 4 was obtained.

III.3

500 parts of EG were mixed with 300 parts of AlP, the mixture was then dried and granulated and the granules were pre-expanded at 230° C. The free-flowing pre-expanded product (650 parts) was sprayed with 100 parts of HB in a high-speed paddle mixer analogously to III.2. The resulting material was crumbly and was introduced into the mould in an amount of 34.5 g and expanded at 600° C. for 1 hour. The resulting sheet had an IR of 113, no odour and a pH of 4.

III.4

The moist material obtained according to III.3 was dried in a paddle drier. It then had a bulk density of about 135 g/l. It was introduced into the mould in an amount of 30 g, the mould thus not being completely filled, and was expanded at 700° C. for 1 hour. A sheet having an IR of 110, no odour and a pH of 4 was obtained.

III.5

The granules having a bulk density of 135 g/l obtained according to III.4 were pressed into the mould in an amount of 45 g and then expanded at 295° C. for 1 hour. A solid sheet which had a density of 150 kg/m$^3$, no odour and a pH of 4 was obtained which, when exposed to a natural gas flame, underwent vigorous intumescence at the point of exposure to the flame. Cable ducts produced from such sheets can be employed, in particular, for preventive fire protection.

III.6

500 parts of EG were mixed with 300 parts of AlP and 100 parts of HB. The material, on a belt of polyolefin, was passed through a microwave oven, whereupon the material was dried and converted into a pre-expanded product having a density of 250 g/l. The material thus obtained was expanded again, doubling in volume, by being introduced into the microwave oven again, and then had a bulk density of about 120 g/l. 45 g of this material were forced into the mould, which was then closed, and the material was expanded at 580° C. for two hours. A sheet having a density of 150 kg/m$^3$ and an IR of 142 was obtained.

When only 30 g were introduced into the mould, a sheet having a density of 99 kg/m$^3$ and an IR of 112 was obtained after expansion at 320° C. for 1 hour.

When only 15 g were introduced into the mould, a sheet having a density of 50 kg/m$^3$, an IR of 58, no odour and a pH of 4 was obtained after expansion at 700° C. for 0.5 hour.

This lightweight type of sheet is particularly suitable for sound absorption purposes, if appropriate in combination with types which have higher densities.

What is claimed:

1. A molding consisting essentially of (1) expanded graphite, (2) 4% to 75% by weight of an acid phosphate of a metal selected from the group consisting of metals of Group 2 of the Periodic Table of the elements, metals of Group 3 of the Periodic Table of the elements, and mixtures thereof, and (3) 5% to 70% by weight of a binder having a boiling point above 180° C. and a decomposition point between 180° C. and 600° C., said binder being different than said acid phosphate; the balance of weight % of said molding being said expanded graphite, said molding having a density of 30 to 450 kg/m$^3$, and having been formed in a closed mould which is permeable to gas.

2. The moulding of claim 1 wherein said expanded graphite is in the form of a mixture with an additive, which mixture contains from 85–20% by weight expanded graphite and the balance of said mixture is additive.

3. A process for the production of moldings containing expanded graphite and having a density of 30–450 kg/m$^3$ which consists essentially of (1) combining expandable graphite with an acid phosphate of a metal selected from the group consisting of metals of Group 2 of the Periodic Table of the elements, metals of Group 3 of the Periodic Table of the elements, and mixtures thereof, and a binder having a boiling point above 180° C. and a decomposition point between 180° C. and 600° C., said binder being different than said acid phosphate; (2) heating said combination at a temperature of from 180° C. to 1000° C. in a mould which is closed, but permeable to gas, said acid phosphate being present in an amount of from 4% to 75% by weight, said binder being present in an amount of from 5 to 70% by weight and the balance being expandable graphite, the total of said components being 100% by weight, and (3) removing said molding from said mould.

4. The process of claim 3 in which an expandable graphite selected from the group consisting of SO$_x$ expandable graphite, NO$_x$ expandable graphite and mixtures thereof is employed.

5. The process of claim 3 wherein said acid phosphate is an acid phosphite of a metal selected from the group consisting of magnesium, calcium, zinc and aluminum.

6. The process of claim 3 in which said binder is selected from the group consisting of tars, bitumens, carbohydrates, polymers, residual substances and mixture thereof.

7. The process of claims 3, wherein the expandable graphite is partially pre-expanded before being placed in the mould.

* * * * *